Patented Feb. 9, 1943

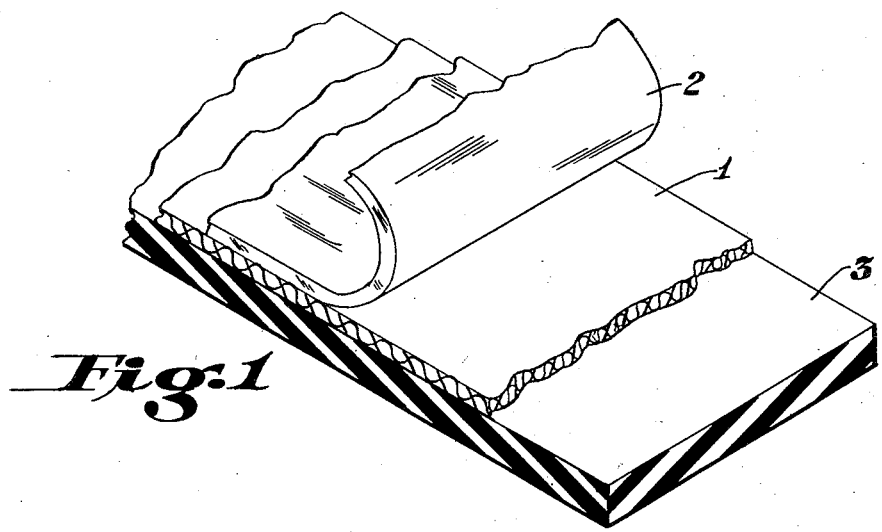
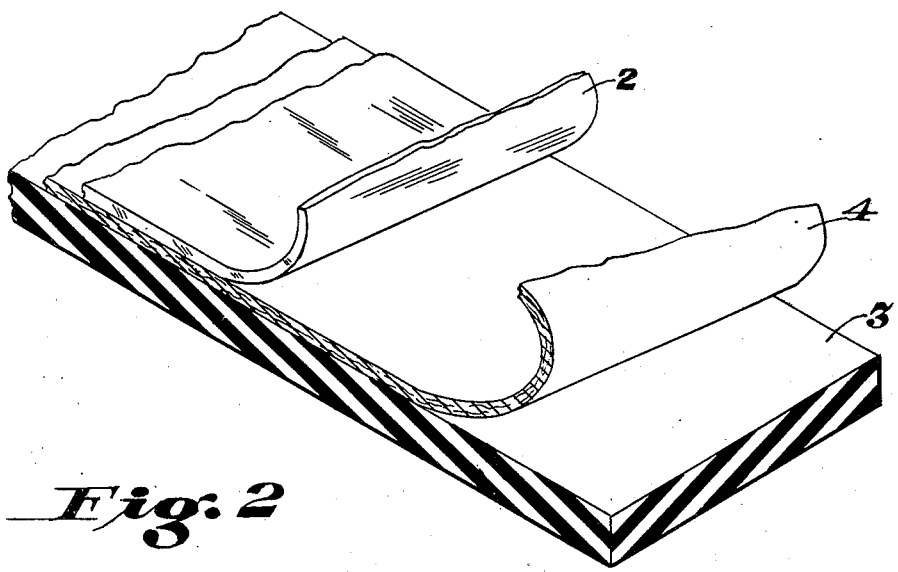

2,310,740

UNITED STATES PATENT OFFICE 2,310,740

ADHESIVE TAPE

Joseph B. Leavy, Newburgh, N. Y., assignor to E. I. du Pont de Nemours & Company, Wilmington, Del., a corporation of Delaware Application January 29, 1942, Serial No. 428,741

3 Claims. (Cl. 250—81)

This invention relates to adhesive tape and more particularly to a luminescent adhesive tape which may be stuck to doorways, entrances and smaller objects for identification in the dark.

Heretofore it has been known that certain salts, particularly those of radium and sulfides of the alkaline earth metals, have the property of absorbing light from the sun, or from a source of artificial light of a suitable wave length, rendering them luminescent for a considerable time when placed in the dark. After the luminescence has been lost, it may be restored by again exposing the salt to light, either artificial or natural.

It has been found that when certain vehicles or binders are used for applying such salts to a support, the efficiency of the luminescent material is considerably decreased. In the case of nitrocellulose binder during the degradation of the nitrocellulose acid bodies are given off which destroys the luminescent property of the luminous pigment.

It is therefore an object of this invention to provide a tape with a luminescent surface to be used on doors, walls and smaller objects during blackout or other emergencies.

It is a further object of this invention to provide an adhesive tape having an efficient luminescent surface which may be reactivated repeatedly.

A still further object is the provision of a binder for a luminous pigment which does not have a deleterious effect on the luminosity of the pigment upon prolonged contact.

Other objects will appear as the description of the invention proceeds.

The foregoing objects are accomplished by coating a base material on one side with a conventional pressure-sensitive adhesive mass, such as is commonly used on surgical or industrial adhesive tape. The other side of the base material is coated with a composition containing a luminescent salt and a minimum of binder which does not have a deleterious effect on the luminosity of the pigment.

It has been found that cellulose ethers are particularly well adapted as binders for such salts for the reason that they do not interfere with the activation of the luminescent salt by the useful range of the spectrum and require a minimum amount of plasticizer for suitable plasticization. Other binders which may be used with varying degrees of success include vinyl resins and methacrylate resins. The preferred embodiment of the invention is represented by a binder which is an organic derivative of cellulose as distinguished from the nitrate. Examples other than the ethers are cellulose acetate, cellulose acetopropionate and cellulose acetobutyrate. In the illustrative examples these may replace the ethyl cellulose and benzyl cellulose.

In the drawing Figure 1 represents a cross section of a portion of the material prepared according to the present invention. In this figure, 1 represents a cloth base, 2 indicates a cellulose ether luminescent pigment coating and 3 is the pressure-sensitive adhesive mass. In Figure 2, 4 represents a paper base and 2 and 3 are the cellulose ether coating and the pressure-sensitive rubber composition respectively.

The invention may be illustrated by the following examples but it is to be understood that the invention is not restricted thereto.

EXAMPLE I

A plain woven cotton fabric, weighing approximately 3.78 ounces per linear yard 40 inches wide and having a thread count of warp 80, and filler 80 was coated with a compositoin having approximately the following formula:

*Coating Composition A*

| | Per cent by weight |
|---|---|
| 14.8% ethyl cellulose solution | 29.6 |
| Mill base | 70.4 |

The ethyl cellulose solution in coating composition A prepared by dispersing ethyl cellulose in a solvent mixture in the following proportion:

*Ethyl cellulose solution*

| | |
|---|---|
| Ethyl cellulose | 14.8 |
| Toluol | 34.1 |
| 99% ethyl acetate | 42.6 |
| 95% ethyl alcohol | 8.5 |

The ethyl cellulose and solvent mixture were subjected to a mixing operation for approximately 3 to 5 hours in suitable mixing equipment. A 5% solution of the ethyl cellulose in a 60–40 mixture of ethanol and toluene at 25° C. has a viscosity of 300 centipoises. The ethoxy content is 46.5 to 49.5%.

The mill base in the coating composition A was prepared by grinding together the following ingredients in the proportions indicated:

*Mill base for coating Composition A*

| | Per cent by weight |
|---|---|
| Luminescent pigment | 50.00 |
| Phthalic di-ester of mono methyl ether of ethylene glycol | 20.85 |
| 14.8% ethyl cellulose solution (described above) | 9.72 |
| Toluol | 7.77 |
| 99% ethyl acetate | 9.72 |
| 95% ethyl alcohol | 1.94 |

The mill base ingredients were subjected to a grinding operation in a ball mill for approximately 6 to 8 hours. The mill base may also be dispersed on the roller mills.

A detailed breakdown of the coating composition A is given below and the numbers in parentheses indicate the percentages of the non-volatile ingredients after the volatile solvents have been expelled.

*Breakdown of coating Composition A*

| | Per cent by weight |
|---|---|
| Ethyl cellulose | 5.4 (10.9) |
| Luminescent pigment | 35.29 (71.3) |
| Plasticizer | 8.8 (17.8) |
| Toluol | 23.8 |
| 99% ethyl acetate | 22.3 |
| Ethyl alcohol | 4.5 |

A plurality of coats may be applied until the desired amount of the coating containing the luminescent pigment has been built up on the surface. Approximately 3.0 ounces of non-volatile ingredients of the coating composition produce satisfactory results. The material may be embossed if desired although this is not necessary.

The uncoated side of the material thus prepared is coated by spreading a suitable quantity of a pressure-sensitive rubber adhesive mass, such as described in U. S. Patent 2,137,969. Other examples of such compositions and their mode of application are also disclosed in "The Chemical Formulary" by Bennett, volume 2, page 366, D. Van Nostrand Co., New York (1935) and "The Pharmacopoeia of the United States of America" eleventh decennial revision, Mack Printing Co., Easton, Pa. (1936).

EXAMPLE II

An adhesive paper tape material was produced by coating a strong 25 lb. crepe kraft paper in accordance with the disclosure given above in Example I except the following cellulose ether composition was employed:

*Coating Composition B*

| | Per cent by weight |
|---|---|
| Benzyl cellulose solution | 25.63 |
| Mill base | 74.37 |

The benzyl cellulose solution was prepared by dispersing benzyl cellulose in ethyl acetate in the following proportion:

*Benzyl cellulose solution*

| | |
|---|---|
| Benzyl cellulose | 20.68 |
| Ethyl acetate | 79.32 |

The mill base in coating composition B was prepared by grinding together the following ingredients in the proportions indicated:

*Mill base for coating Composition B*

| | |
|---|---|
| Luminescent pigment | 57.14 |
| Butyl phthalyl butyl glycollate | 14.29 |
| 5% solution of benzyl cellulose in ethyl acetate | 28.57 |

A detailed breakdown of coating composition B is given below and the numbers in parentheses indicate the percentages of the non-volatile ingredients after the volatile solvents have been expelled.

*Breakdown of coating composition B*

| | Per cent by weight |
|---|---|
| Benzyl cellulose | 6.36 (10.69) |
| Luminescent pigment | 42.50 (71.45) |
| Butyl phthalyl butyl glycollate | 10.63 (17.86) |
| Ethyl acetate | 40.51 |

It will be noted from the examples that the percentage of pigment is relatively high. In the preferred embodiment of the invention the percentage is as high as possible up to the point where the luminescent material chalks off readily or is easily abraded. It has been found that by using ethyl cellulose and a plasticizer in the ratio of 1 to 1.8 as the binder for the luminescent pigment the dry coating composition may contain as high as 80% of the luminescent pigment and obtain a pliable film which is satisfactory for the purpose of this invention. If the coating contains less than 50% of the luminous pigment the glow in the dark is not sufficiently intense for the purpose of this invention. However, the invention is not to be limited to this particular range since lesser amounts result in varying degrees of success. It will be understood that the base may be of any suitable fabric, such as woven textiles, felts, or paper, and in some cases wood or metal may serve.

Plasticizers or mixtures thereof other than those given in the examples which may be used with the cellulose ether with varying degrees of success are phthalic di-ester of monobutyl ether of ethylene glycol, dibutyl phthalate, tricresyl phosphate, dicresyl ether of diethylene glycol, mixtures of ortho and para toluene ethyl sulfonamides and butyl phthalyl butyl glycollate. There is no limitation on the plasticizer as long as it suitably plasticizes the binder and is innocuous to the rubber adhesive mass and is not sufficiently acid in character to adversely affect the luminosity of the pigment. Likewise any binder which is sufficiently acid in character or liberates acid bodies which adversely affect the luminosity of the pigment is to be avoided.

The preferred luminescent pigment is calcium sulfide although the sulfides of barium and strontium are suitable. As is well known in the art, the pure alkaline earth sulfides do not phosphoresce but are dependent on the presence of some foreign substance, usually minute traces of other elements, such as bismuth, cadmium, manganese, zinc, etc. which modify the color of the phosphorescent glow. The nitrates of uranium and thorium may be added to barium and strontium compounds for special tints although these do not have much effect on calcium sulfide. Metal oxides which yield a characteristic flame test as a rule give the same tint to the luminescent paint. The following are examples of methods of preparing luminescent pigments suitable for incorporation in the vehicle which is subsequently applied to the tape.

1

| | Parts by weight |
|---|---|
| Strontium carbonate | 100.00 |
| Sulphur | 100.00 |
| Potassium chloride | 0.5 |
| Sodium chloride | 0.5 |
| Manganese chloride | 0.4 |

This material gives a violet luminescense.

2

| | |
|---|---|
| Strontium carbonate | 100.00 |
| Sulphur | 30.00 |
| Sodium carbonate | 2.00 |
| Sodium chloride | 0.5 |
| Manganese sulphate | 0.2 |

This material gives a deep yellow phosphorescence.

3

| | |
|---|---|
| Strontium thiosulphate | 60.00 |
| Bismuth nitrate | 0.1 |
| Uranium nitrate | 0.05 |

This material gives an emerald green phosphorescence.

4

| | |
|---|---|
| Calcium oxide | 20.00 |
| Sulphur | 6.00 |
| Starch | 2.00 |
| Bismuth nitrate | 0.008 |
| Potassium chloride | .15 |
| Sodium chloride | .15 |

This material gives a violet phosphorescence.

The materials in each of the above examples are heated to about 1300° C. after which they are allowed to cool and are ground. These are then ready for incorporation in the coating composition. Other metallic oxides may be used to give the phospherescence the characteristic tint of the metal.

It is to be mentioned that small portions of non-luminescent pigments such as, e. g., titanium dioxide, zinc oxide, cadmium reds, aluminum powder, ultramarine blue, etc. may be blended with the luminescent pigments to obtain various color effects. The use of pigments containing large proportion of iron should be avoided since they have a deleterious effect on the luminosity. Further materials containing copper and manganese should be avoided since they attack the rubber adhesive mass.

When the adhesive tape material is to be used outdoors the coating is sometimes subjected to excessive moisture which tends to hydrolize the sulphide pigment and destroy the luminosity of the pigment.

When the material is to be subjected to excessive moisture it has been found desirable to apply an unpigmented coat of cellulose derivative composition as the final surface coat over the coating containing the luminescent pigment. A suitable composition for the surface comprises a clear unpigmented ethyl cellulose solution. The following composition was found suitable for application as the surface coat:

Coating Composition C

| | Per cent by weight |
|---|---|
| Ethyl Cellulose | 14.8 |
| 99% ethyl acetate | 42.6 |
| 95% ethyl alcohol | 8.5 |
| Toluene | 34.1 |

Approximately 1.0 wet ounce of the above composition was applied per linear yard 40 inches wide, over the plasticized composition.

The brightness and duration of the luminosity are largely dependent on: the percentage of pigment in the media, particle size of the luminescent pigment, the nature and type of the media used as the vehicle and the duration of irradition or activation of the luminous pigment.

The ethyl cellulose in the coating Composition C was the same as that used in the coating Compositions A and B.

In place of ethyl cellulose and benzyl cellulose, other cellulose ethers may be used, as well as cellulose acetopropionate and cellulose acetobutyrate.

In the preferred embodiment of the invention phosphorescent pigments which glow after an exciting light source has been removed are mentioned. However, fluorescent materials which only glow while being excited by light of suitable wave length may also be used.

The primary advantage of the present invention is that the tape so-made may be readily applied to such places as stairways, airplane hangar boundaries, companion ways on shipboard, edges of railway platforms, sidewalk curbs, etc. in an emergency which occurs during an air raid. The luminescent pigment composition prepared according to the present invention remains active for about 24 hours and after a few hours exposure to sunlight or suitable artificial light is again activated for a similar period. Tape, such as herein disclosed, is particularly useful for identifying objects in the dark during a blackout.

By the term "luminescent" as used throughout the foregoing specification and in the appended claims is meant that property of a material which which causes visible light rays to be emitted after an exciting light source has been removed, as well as that property of a material to glow under a source of light of low visibility and suitable wave length as an exciting source.

It is apparent that many widely different embodiments of this invention may be made without departing from the spirit and scope thereof, and therefore, it is not intended to be limited except as indicated in the appended claims.

I claim:

1. An article of manufacture comprising a sheet material having a base coating on one side comprising a cellulose ether binder and from 50 to 80 per cent thereof of a luminous material, a clear unpigmented cellulose ether coating superposed over said base coating, and a pressure-sensitive adhesive coating on the opposite side.

2. The article of claim 1 in which the cellulose ether is ethyl cellulose.

3. An article of manufacture comprising a base sheet material coated on one side with a luminous coating having the following approximate compositions:

| | Per cent |
|---|---|
| Ethyl cellulose | 10.9 |
| Luminescent material | 71.3 |
| Plasticizer | 17.8 | said luminous coating overcoated with a coating of ethyl cellulose and a pressure-sensitive coating on the opposite side of said sheet material.

JOSEPH B. LEAVY.